(12) United States Patent
Hicks et al.

(10) Patent No.: US 8,963,865 B2
(45) Date of Patent: Feb. 24, 2015

(54) TOUCH SENSITIVE DEVICE WITH CONCENTRATION MODE

(71) Applicant: barnesandnoble.com llc, New York, NY (US)

(72) Inventors: Kourtny M. Hicks, Sunnyvale, CA (US); Dale J. Brewer, San Marcos, CA (US); Amir Mesguich Havilio, Palo Alto, CA (US); Gerald B. Cueto, San Jose, CA (US)

(73) Assignee: barnesandnoble.com llc, New York, NY (US)

( * ) Notice: Subject to any disclaimer, the term of this patent is extended or adjusted under 35 U.S.C. 154(b) by 115 days.

(21) Appl. No.: 13/715,221

(22) Filed: Dec. 14, 2012

(65) Prior Publication Data

US 2014/0168076 A1    Jun. 19, 2014

(51) Int. Cl.
*G06F 3/041* (2006.01)
*G06F 3/0488* (2013.01)

(52) U.S. Cl.
CPC .............. *G06F 3/041* (2013.01); *G06F 3/0488* (2013.01); *Y10S 345/901* (2013.01)
USPC .......................................... 345/173; 345/901

(58) Field of Classification Search
CPC ......... G06F 3/041; G06F 3/047; G06F 3/048; G06F 3/0481; G06F 3/04812; G06F 3/0483; G06F 3/0484; G06F 3/04842; G06F 3/04845; G06F 3/0485; G06F 3/0488; G09G 2380/14
USPC .......................... 345/173–178, 156, 905, 901; 178/18.01–18.09, 18.11; 715/764, 772, 715/776
See application file for complete search history.

(56) References Cited

U.S. PATENT DOCUMENTS

| 4,896,543 A | 1/1990 | Gullman |
| 5,633,471 A | 5/1997 | Fukushima |
| 5,844,557 A | 12/1998 | Shively, II |

(Continued)

FOREIGN PATENT DOCUMENTS

EP    0722150 A1    7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Stephen Sherman
(74) *Attorney, Agent, or Firm* — Finch & Maloney PLLC

(57) ABSTRACT

Techniques are disclosed for providing a concentration mode in electronic touch sensitive devices. The concentration mode can be used to highlight given textual content on a line by line basis, or other consumable content. The user can engage the mode with a particular gesture. Once engaged, a UI feature is displayed that assists the user in viewing the given content. In some cases, the UI feature includes a reading pane that encompasses one to three complete lines of displayed text or other content. Background content outside the reading pane can be faded or otherwise softened. In some cases, the UI feature also includes, or alternatively includes, a straight-edged reading guide. The initial placement of the UI feature can be set, for instance, based on the initial contact point touched by the user. As the contact point moves, the UI feature moves accordingly. Concentration mode disengages when user releases contact point.

20 Claims, 8 Drawing Sheets

(56) References Cited

U.S. PATENT DOCUMENTS

| | | | |
|---|---|---|---|
| 6,259,438 B1 | 7/2001 | Fleck et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0116421 A1 | 8/2002 | Fox et al. | |
| 2003/0068088 A1* | 4/2003 | Janakiraman et al. | 382/229 |
| 2003/0193481 A1* | 10/2003 | Sokolsky | 345/173 |
| 2006/0026521 A1* | 2/2006 | Hotelling et al. | 715/702 |
| 2007/0047002 A1 | 3/2007 | Hull et al. | |
| 2008/0036747 A1 | 2/2008 | Hope | |
| 2010/0088653 A1* | 4/2010 | Yach et al. | 715/863 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0148786 A1* | 6/2011 | Day et al. | 345/173 |
| 2011/0258542 A1 | 10/2011 | Kenney et al. | |
| 2011/0320978 A1* | 12/2011 | Horodezky et al. | 715/823 |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0192117 A1* | 7/2012 | Migos et al. | 715/863 |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0293528 A1* | 11/2012 | Larsen | 345/589 |
| 2012/0311438 A1* | 12/2012 | Cranfill et al. | 715/256 |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0047115 A1* | 2/2013 | Migos et al. | 715/776 |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touch1, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen the future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

(56) References Cited

OTHER PUBLICATIONS

Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com, http://mobile.brando.com/prod_detail.php?prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

"How to Remote Wipe an iPhone or iPad," OSXDaily, http://osxdaily.com/2012/06/05/remote-wipe-iphone-or-ipad/, 4 pages, printed from the Internet on Feb. 2, 2013.

"Screen hotspot," Wikipedia, the free encyclopedia, http://en.wikipedia.org/wiki/Screen_hotspot, 1 page, printed from the Internet on May 15, 2013.

"PAiA-Touch Switches," PAiA Corporation USA, file:///S:/Client%20Files/Barnes%20&%20Noble/IDS%20Master%20Folder/S&G%20-%2 . . . , 3 pages, printed from the Internet Aug. 27, 2013.

Kanai, et al., "Intra-Rendition Navigation," Copyright 2012-2013 International Digital Publishing Forum (IDPF), 13 pages.

"Explaining how the sPen tech works (and is very diff than other styluses), http://forum.xda-developers.com/showthread.php?t=," 1 page, printed from the Internet on Jan. 15, 2013.

\* cited by examiner

TOUCH SENSITIVE DEVICE WITH CONCENTRATION MODE

FIELD OF THE DISCLOSURE

This disclosure relates to electronic display devices, and more particularly, to user interface techniques for interacting with touch sensitive devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
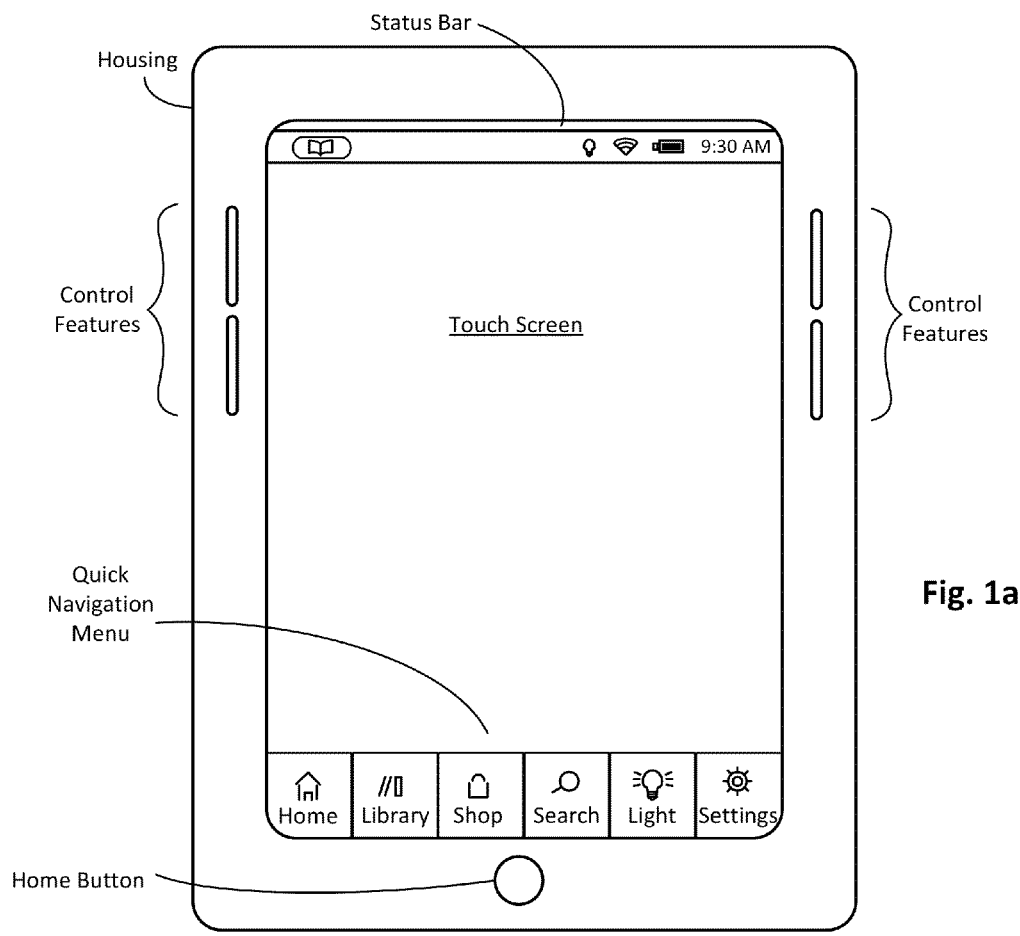
FIGS. 1a-b illustrate an example electronic touch sensitive device having a concentration mode configured in accordance with an embodiment of the present invention.

Techniques are disclosed for providing a concentration mode in electronic touch sensitive devices, such as touch screen and track pad devices. The concentration mode can be used to highlight given textual content on a line by line basis, or other consumable content (e.g., line of photos or graphics, etc). The user can engage the mode, for instance, with a particular touch screen/pad gesture. Once engaged, a user interface (UI) feature is displayed that assists the user in viewing the given content. In some cases, the UI feature includes a reading pane that encompasses one to three complete lines of displayed text or other content. Background content outside the reading pane can be faded or otherwise softened, if so desired. In some cases, the UI feature also includes, or alternatively includes, a straight-edged reading guide. The initial placement of the UI feature can be set, for instance, based on the initial contact point touched by the user, or at some predetermined location. In some cases, as the user moves the contact point, the UI feature moves accordingly; in other cases, once engaged, the UI feature advances automatically at a pace suitable to the user's consumption speed. Concentration mode may be paused or disengaged, for example, based on a further specific user contact or release of contact point.

General Overview

As previously explained, electronic display devices such as tablets, eReaders, and smart phones are commonly used for displaying user interfaces and consumable content. The user of such devices can typically read the displayed content with relative ease. In some instances, however, the user might prefer a viewing guide to enhance the consumption experience. For instance, some people like to read physical books with a ruler or straight edge to accentuate the current line being read. Likewise, some people prefer to read with a magnifying glass or large print books. While some electronic devices are provided with large print or have a magnifying glass feature, there does not appear to be a user interface reading guide that can be intuitively engaged and disengaged by the reader.

Thus, and in accordance with an embodiment of the present invention, techniques are provided for engaging, maintaining, and exiting a concentration mode in electronic touch sensitive devices. The concentration mode can be used, for example, to highlight given textual content on a line by line basis, or other consumable content. In some embodiments, the mode can be engaged globally, so as to allow for use in any number of different applications available on a given device, such as a tablet or mobile phone. For instance, the concentration mode may be used in an eBook application, a browser application, an email application, a word processing application, a PDF viewer application, or any other application where it might be useful to the user to have a reading guide as described herein. The user can engage the mode with a particular gesture that uniquely and globally indicates a desired intent to engage the mode, such as a touch or press-and-hold at the edge of the device touch screen or track pad, or on the device home button (or other such physical feature), or a tap or sequence of taps on a housing configured with acoustics sensors. In a more general sense, any uniquely identifiable touch of a touch sensitive surface by the user can be used to engage the concentration mode. The uniqueness of the touch may be based, for example, on the particular location of the touch and/or the nature of the touch (e.g., a press-and-hold for a predetermined duration, the number of simultaneously applied contact points, a sequence of taps, drags, swipes, circular or elliptical gestures, etc). Once engaged, a UI feature is displayed to the user that assists the user in focusing on the given content. In some cases, the UI feature includes a reading pane that encompasses one to three complete lines of displayed text or other content to be focused on. A 'complete line' refers to, for example, a line of content that spans from the farthest left piece of content displayed on a given line to the farthest right piece of content displayed on that same line.

The line of content may be a string of words, or one or more graphics provisioned along a line or otherwise spanning from the farthest left edge to the farthest right edge, or a string of Magnification can be provided if so desired, and background content outside the reading pane can be faded or otherwise softened (e.g., blacked-out, blurred, etc) from the user's view so as to further accentuate the content within the reading pane. In some cases, the UI feature may also include, or alternatively include, a virtual ruler or other such straight-edged reading guide. The initial point of focus provided by the UI feature can be set, for instance, based on the initial contact point (e.g., finger or stylus) designated by the user, or at a predetermined location or at the beginning of the text/content for a given page. In some specific embodiments, as the contact point (or points) moves on the touch screen or track pad, the provisioned UI feature moves accordingly, thus allowing the user direct control over advancement of the reading guide UI feature.

Thus, once the concentration mode is engaged, the user may continue to maintain the engagement contact points while the UI feature moves in unison with the user's hand movement. In some cases, the user can keep just one of the engagement contact points in place while the UI feature moves in unison with the user dragging of that point. In some such embodiments, the user may move the contact point back up a page (rather than down the page), for example, to review text previously read, if so desired. Once the review is done, the user can then speed-drag the contact point to the desired place and continue with consuming the content in the concentration mode. As will be appreciated in light of this disclosure, numerous dragging schemes can be used to effectively advance the highlighted content region accordingly, in accordance with an embodiment. If no contact points remain, the concentration mode will disengage, in some embodiments.

In other embodiments, once the concentration mode is engaged, the displayed UI feature will remain engaged and advance automatically at a predetermined speed (e.g., user-configurable speed) starting at the top of each page (or beginning of content for that page) and steadily progressing to the bottom of each page (or end of content for that page). In such an embodiment, the user can pause the auto-advance function, for instance, by touching a pause button UI feature provisioned somewhere on the touch screen display. In some such cases, if the user manually moves the reading pane/ruler UI feature (via contact with the touch screen or track pad), the auto-advance function will switch to a paused mode and the user may freely move the UI feature based on dragging contact with the touch screen or track pad. Once the user is done with manual manipulation of the reading pane UI feature, the auto-advance mode can be re-started by, for example, touching a play button UI feature provisioned somewhere on the touch screen display (e.g., interchangeably located with pause button). In addition, the user can exit or otherwise terminate the auto-advance concentration mode, for example, by selecting an end mode UI feature provisioned on the touch screen, or by depressing the home button or some other physical button of the device that can be purposed to terminate a given operation mode. Numerous termination schemes will be apparent in light of this disclosure.

Additional functions and features can be added to further enhance the user's experience. For example, once the reading guide is deployed, the user may touch the content within (and/or at the edge of) the reading guide area so as to further cause that text to be accentuated. For instance, some people like to read with their finger tip. Thus, in one example case for an eBook application, as the user places a finger at the beginning of a sentence within/at the reading guide, another UI feature is activated to highlight the word at the user's fingertip, in accordance with an embodiment. The highlighting may be, for instance, bolding, underlining, magnifying, or a change in color. As the user moves her fingertip down the sentence, the word highlighting advances accordingly to follow the finger. In another embodiment, where the reading guide includes a reading pane, the user may resize the reading pane once it is deployed on screen so that, for example, additional lines of text can be viewed (e.g., change from one to three lines of text). In some such cases, a highlighting feature as just described can also be provisioned. With the expanded reading pane, the highlighting feature may include several words at a time (e.g., 2 to 5 words), if so desired, and in accordance with an embodiment of the present invention. Such optional features can be user-configured or hard-coded, as will be appreciated.

The techniques can be implemented in an intuitive manner, so that the user can seamlessly and selectively engage, pause, and/or disengage the concentration mode without disrupting the reading experience, in accordance with some embodiments. For instance, in one specific such embodiment, a two-finger press-and-hold or other touch gesture along the border region of the display screen can be used to automatically create the UI feature (e.g., pane or straight edge) to accentuate one complete line of text at a time. The two fingers may be, for example, the user's pointer and middle fingers (or the thumb and pointer finger) of one hand on one side of the display, or the user's thumbs on each side of the display. Alternatively, a stylus could be used in combination with one or more fingers. For instance, for a right-handed user, the left thumb could be placed at the left-side border of the display and the stylus tip at the opposing right-side border. Alternatively, a stylus could be used on its own to engage the mode, for example, by laying the stylus on (or otherwise sufficiently near) the touch sensitive surface so as to effectively create multiple contact points that can be identified as a request for the concentration mode. In any such cases, the use of two (or more) contact points can be used to uniquely identify the user's desire to engage the concentration mode. Numerous uniquely identifiable engagement schemes that exploit a touch sensitive surface can be used as will be appreciated in light of this disclosure. Further note that any touch sensitive device (e.g., track pad, touch screen, or other touch sensitive surface, whether capacitive, resistive, acoustic or other touch detecting technology) may be used to detect the user contact, and the claimed invention is not intended to be limited to any particular type of touch sensitive technology, unless expressly stated.

Architecture

Figure 1B:
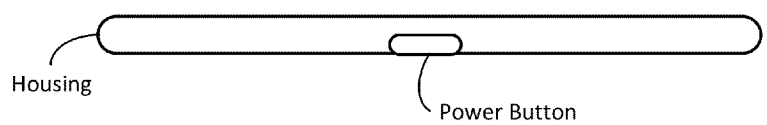

FIGS. 1a-b illustrate an example electronic touch sensitive device having a concentration mode configured in accordance with an embodiment of the present invention. The device could be, for example, a tablet such as the NOOK® Tablet by Barnes & Noble. In a more general sense, the device may be any electronic device having a touch sensitive user interface and capability for displaying content to a user, such as a mobile phone or mobile computing device such as a eReader or laptop, a desktop computing system, a television, a smart display screen, or any other device having a touch screen display or a non-touch display screen that can be used in conjunction with a touch sensitive surface. As will be appreciated, the claimed invention is not intended to be limited to any particular kind or type of electronic device.

As can be seen with this example embodiment, the device comprises a housing that includes a number of hardware features such as a power button, control features, and a press-button (sometimes called a home button herein). A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, such as an auto-advance reading pane UI feature as described herein. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device was stowed into a bag or purse. One physical gesture that would safely put the device to sleep. Thus, in such an example embodiment, the home button may be associated with and control different and unrelated actions: 1) show the quick navigation menu; 2) exit the auto-advance reading pane UI feature mode, but keep the page being read or otherwise consumed displayed; and 3) put the device to sleep.

As can be further seen, the status bar may also include a book icon (upper left corner). In some such cases, the user can access a sub-menu that provides access to a concentration mode configuration sub-menu by tapping the book icon of the status bar. For example, upon receiving an indication that the user has touched the book icon, the device can then display the concentration mode configuration sub-menu shown in FIG. 1d. In other cases, tapping the book icon just provides bibliographic information on the content being consumed. Another example way for the user to access a concentration mode configuration sub-menu such as the one shown in FIG. 1d is to tap or otherwise touch the Settings option in the quick navigation menu, which causes the device to display the general sub-menu shown in FIG. 1c. From this general sub-menu the user can select any one of a number of options, including one designated Screen/UI in this specific example case. Selecting this sub-menu item (with an appropriately placed screen tap) may cause the concentration mode configuration sub-menu of FIG. 1d to be displayed, in accordance with an embodiment. In other example embodiments, selecting the Screen/UI option may present the user with a number of additional sub-options, one of which may include a so-called concentration mode option, which may then be selected by the user so as to cause the concentration mode configuration sub-menu of FIG. 1d to be displayed. Any number of such menu schemes and nested hierarchies can be used, as will be appreciated in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). Additional example details of the underlying OS and circuitry in accordance with some embodiments will be discussed in turn with reference to FIG. 2a.

Figure 1C:
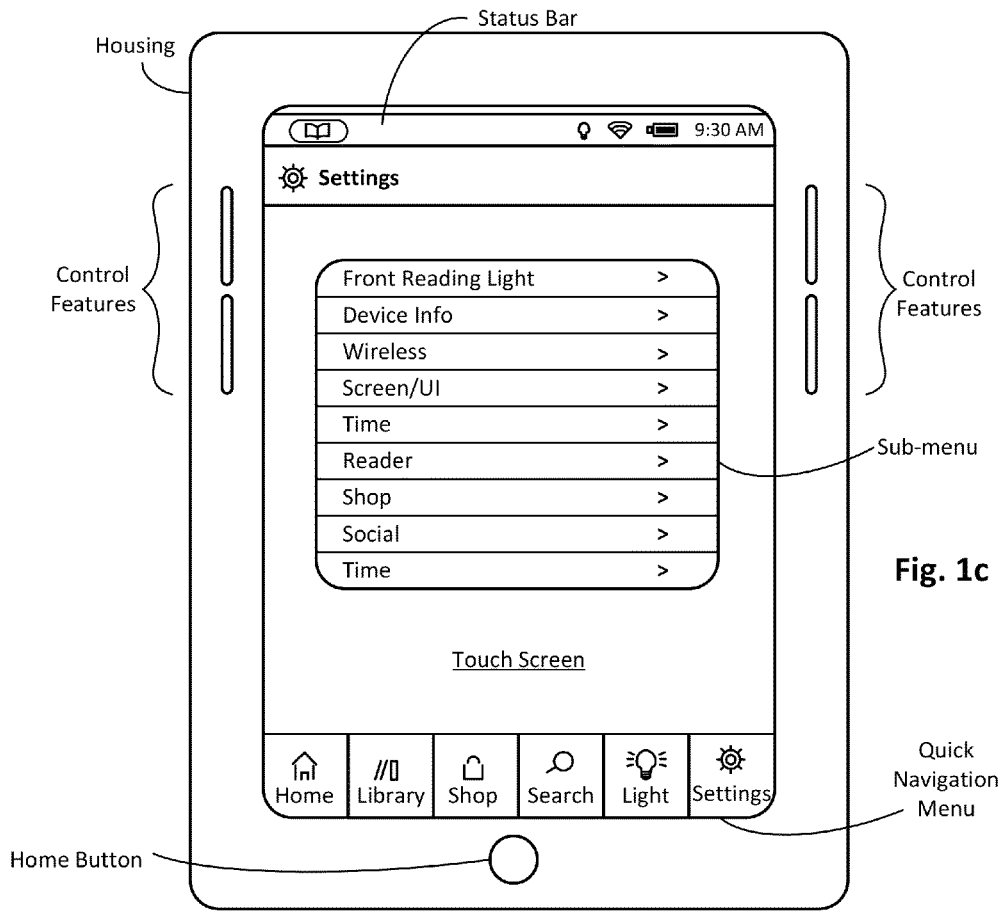
FIGS. 1c-d illustrate example configuration screen shots of the user interface of the electronic touch sensitive device shown in FIGS. 1a-b, configured in accordance with an embodiment of the present invention.
Figure 1D:
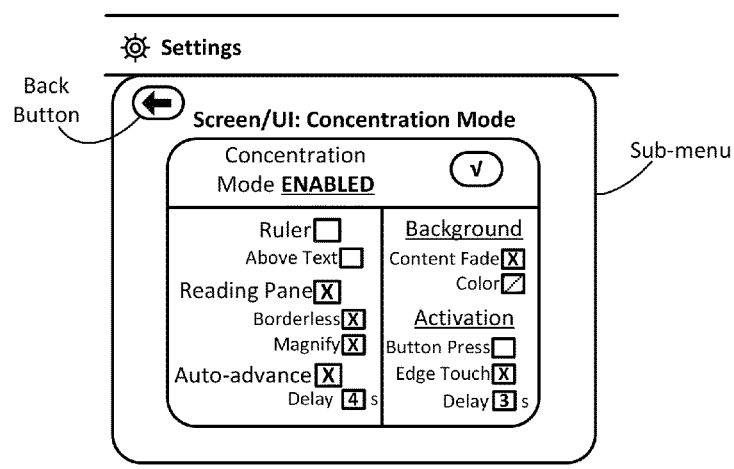

As previously explained, and with further reference to FIGS. 1c and 1d, once the Settings sub-menu is displayed (FIG. 1c), the user can then select the Screen/UI option. In response to such a selection, the concentration mode configuration sub-menu shown in FIG. 1d can be provided to the user. In this example case, the concentration mode configuration sub-menu includes a UI check box that when checked or otherwise selected by the user, effectively enables the concentration mode (shown in the enabled state); unchecking the box disables the mode. Other embodiments may have the concentration mode always enabled, or enabled by a physical switch or button, for example. The user can configure a number of features with respect to the concentration mode, in this example embodiment. In more detail, by checking the Reading Pane check box, the user can select a reading pane based concentration mode which allows a reading pane to be displayed during concentration mode. The reading pane effectively encompasses or otherwise highlights one line of text at a time, in some example cases. As can be further seen, the user may also check the Borderless check box to provide a borderless reading pane and/or the Magnify check box to provide a reading pane having a desired degree of magnification (e.g., 1.5×, 2×, 3×, which may be fixed or user configurable), if so desired. In addition, or alternatively, by checking the Ruler check box, the user can select a ruler-based concentration mode which allows a virtual ruler or straight-edge to be displayed during concentration mode. In this example case, the ruler is deployed below the line of text to be read by default, but the user can further check the Above Text check box to provide the ruler above the line of text to be read, if so desired. Note that both the Ruler and Reading Pane check boxes may be checked to provide a hybrid UI feature to assist the reading experience. With further reference to the example embodiment of FIG. 1d, note that the reading pane/ruler UI feature is advanced manually by the user as the default setting, but the user can further check the Auto-advance check box which allows the UI feature to advance automatically at a pace suitable to the user's consumption speed, if so desired. Note that user can further specify the delay time the UI feature dwells on each line of text (or other content being consumed).

With further reference to FIG. 1d, the user may also set certain background features in this example embodiment. In particular, the text/content outside the area of focus provided by the reading pane/rule UI feature is effectively left as-is by default setting, but the user can further check the Content Fade check box which grays out or otherwise softens background content not within the highlighted reading area, if so desired. The user may also select the color scheme for the highlighted reading area and/or background, by selecting the Color UI control and selecting the desired scheme, for example. Also configurable in this example embodiment is the mechanism by which the user engages the concentration mode as well as the activation time. In particular, the user can assign the mode engagement function to a hardware switch/feature such as the home button by checking the Button Press check box, or to an area of the touch screen by checking the Edge Touch check box. Also, note that the duration which the user's press-and-hold gesture (on either the hardware button or the touch screen) to engage the concentration mode is set to 3 seconds in this example case. Other embodiments may not use such a delay and activate upon contact in the activation region. In addition, a back button arrow UI control feature is provisioned on the touch screen, so that the user can go back to the Settings menu after the concentration mode has been configured, if so desired. While a number of user-configurable features are provided in some embodiments, other embodiments may have any combination of similar features wherein the features are set as a given default or hard-coded, such that no user configuration is necessary.

Figure 2A:
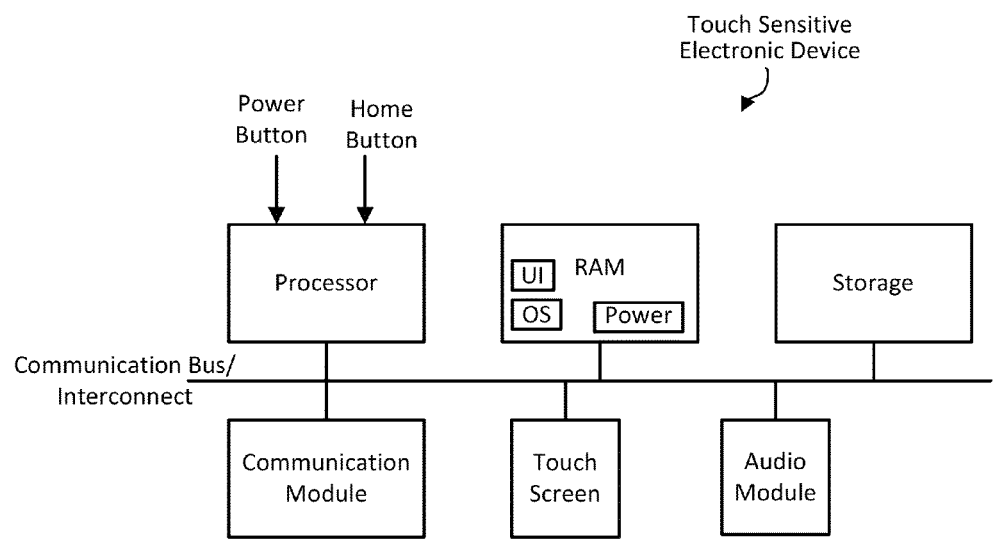
FIG. 2a illustrates a block diagram of an electronic touch sensitive device configured in accordance with an embodiment of the present invention.

FIG. 2a illustrates a block diagram of an electronic touch screen device configured in accordance with an embodiment of the present invention. As can be seen, this example device includes a processor, random access memory (RAM), additional storage/memory, a communications module, a touch screen, and an audio module. A communications bus and interconnect is also provided to allow inter-device communication. Other typical componentry and functionality not reflected in the block diagram will be apparent (e.g., battery, co-processor, etc). Further note that although a touch screen display is provided, other embodiments may include a non-touch screen and a touch sensitive surface such as a track pad, or a touch sensitive housing configured with one or more acoustic sensors, etc. In any such cases, the touch sensitive surface is generally capable of translating a user's physical contact with the surface into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the RAM includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a concentration mode as described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The RAM can be any suitable type of memory and size (e.g., 256 or 512 Mbytes SDRAM), and in other embodiments may be implemented with non-volatile memory or a combination of non-volatile and volatile memory technologies. The storage can also be implemented with any suitable memory and size (e.g., 2 GBytes of flash memory). The display can be implemented, for example, with a 6-inch E-ink Pearl 800×600 pixel screen with Neonode® zForce® touch screen, or any other suitable display and touch screen interface technology. The communications module can be, for instance, any suitable 802.11 b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology and the various example screen shots shown in FIGS. 1a-d, 3a-b, and 4a-f in conjunction with the concentration mode methodologies demonstrated in FIGS. 5 and 6, which will be discussed in turn. The audio module can be configured, for example, to speak or otherwise aurally present a selected eBook or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher).

Client-Server System

Figure 2B:
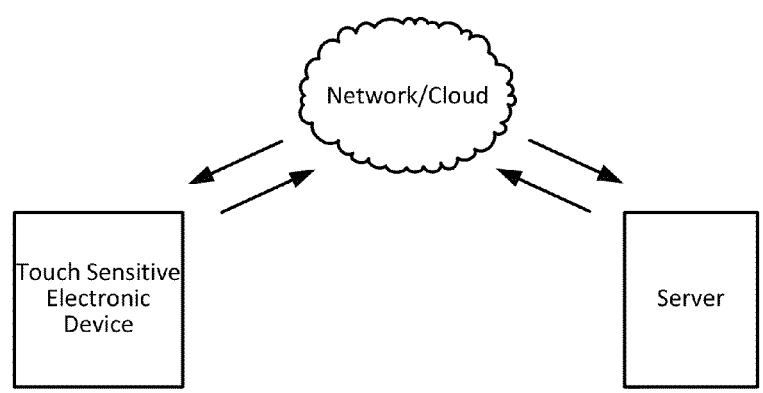
FIG. 2b illustrates a block diagram of a communication system including the electronic touch sensitive device of FIG. 2b, configured in accordance with an embodiment of the present invention.

FIG. 2b illustrates a block diagram of a communication system including the electronic touch sensitive device of FIG. 2b, configured in accordance with an embodiment of the present invention. As can be seen, the system generally includes an electronic touch sensitive device that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by providing the user with requested or otherwise recommended content. Is some such embodiments, the server is configured to remotely provision a reading pane/rule UI feature as provided herein to the touch sensitive device (e.g., via JavaScript or other browser based technology). In other embodiments, portions of the methodology are executed on the server and other portions of the methodology are executed on the device. Numerous server-side/client-side execution schemes can be implemented, as will be apparent in light of this disclosure.

Methodologies

Figure 3A:
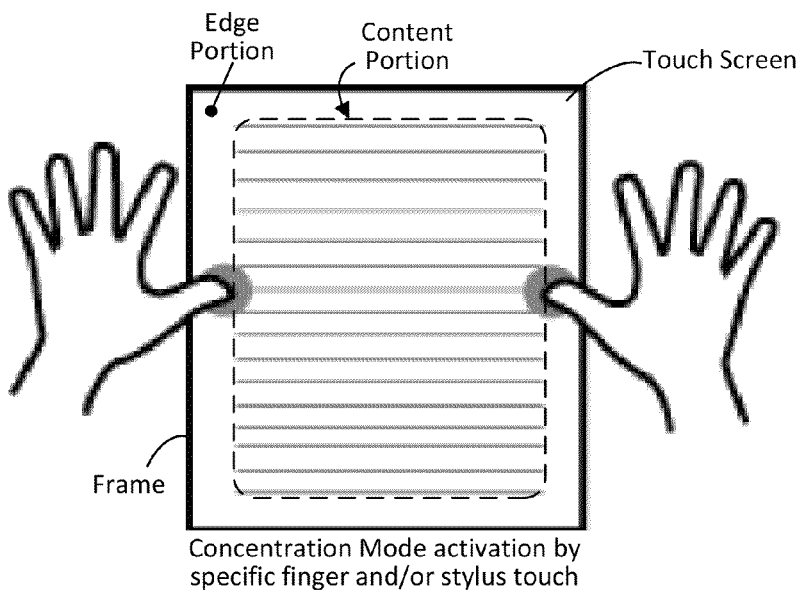
FIGS. 3a-b illustrate an example user interface for engaging a concentration mode of an electronic touch sensitive device configured in accordance with an embodiment of the present invention.
Figure 3B:
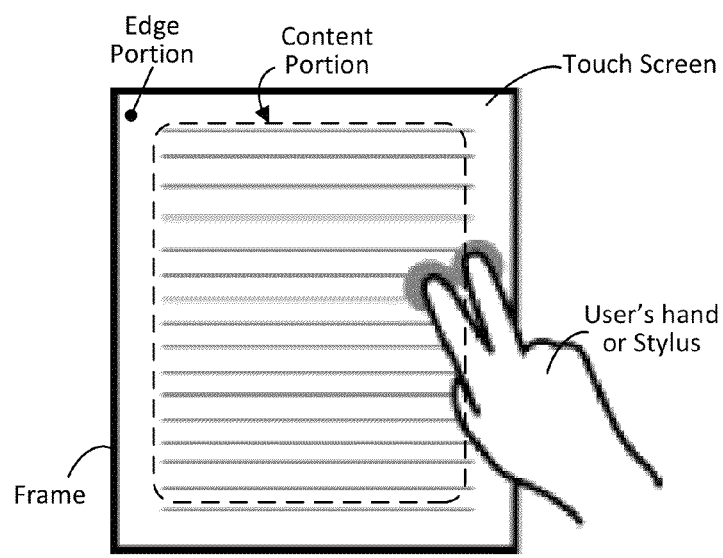

FIGS. 3a-b illustrate an example user interface for engaging a concentration mode of an electronic touch sensitive device configured in accordance with an embodiment of the present invention. As can be seen, the touch screen generally includes a content portion (within the dashed line area) and an edge portion. A physical frame or support structure is provided about the screen. In the example engagement mode shown in FIG. 3a, the user is using two contact points on opposite edges of the touch screen. Note that the two points do not need to be aligned in the horizontal direction, but rather can each be on any point along the respective edge, in some such embodiments. As can be further seen, the user may use any two fingers/thumbs or stylus to create the two (or more) contact points. FIG. 3b is similar to FIG. 3a, except that the two contact points are on the same side of the screen. Further note that the contact points may be in both the edge portion and the content portion. In a more general sense, any portion of the touch screen display can be used as a concentration mode activation zone. Likewise, as previously explained, a hardware button may also be used to activate the concentration mode, if so desired. Numerous uniquely identifiable engagement schemes can be used as will be appreciated in light of this disclosure.

Figure 4A:
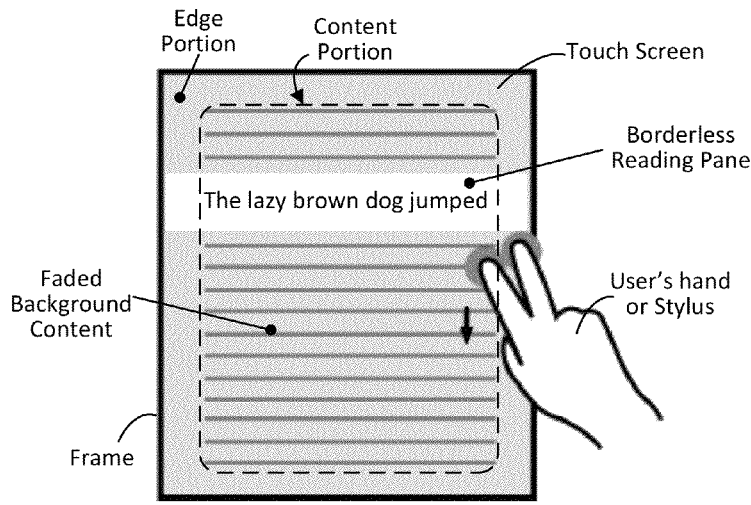
FIGS. 4a-f each illustrates an example user interface screen shot showing an electronic touch sensitive device in a concentration mode, in accordance with an embodiment of the present invention.
Figure 4B:
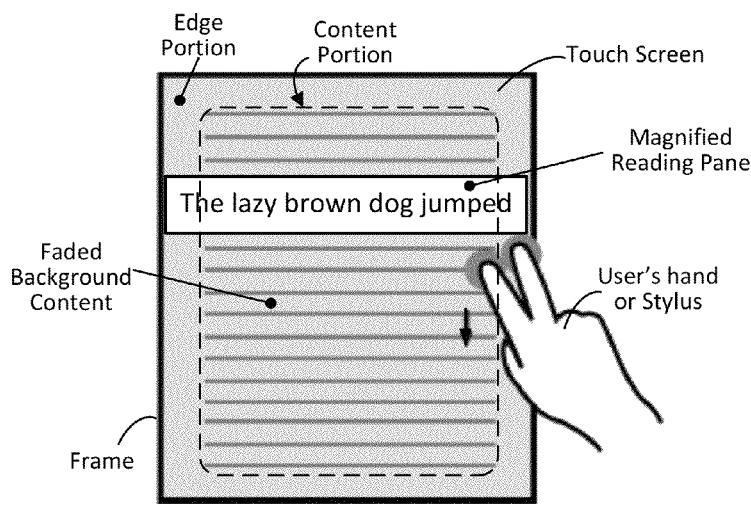
Figure 4C:
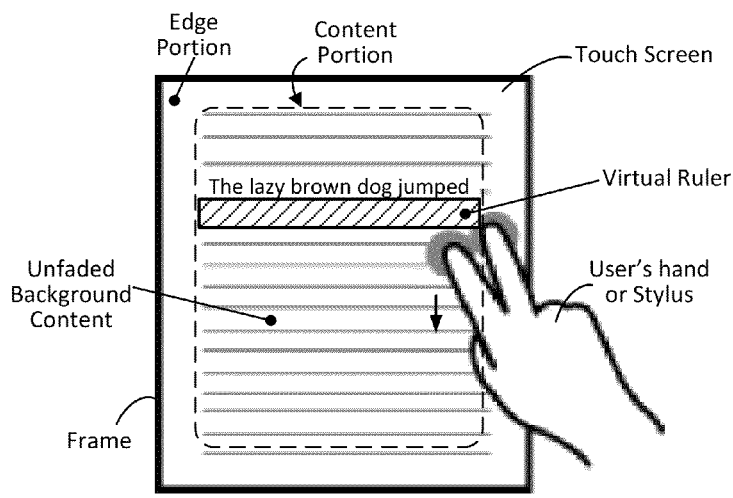

Once engaged, the concentration mode provides the user a UI reading assist feature as configured by the user, as previously discussed with respect to FIG. 1d, for instance. FIGS. 4a-f each illustrates a screen shot showing example such UI features, in accordance with an embodiment of the present invention. With respect to the example of FIG. 4a, a borderless reading pane is provided that highlights a single line of text/content to the user, and all other background content is faded out. As the user's hand or stylus moves down the virtual page, so does the reading pane. The example reading pane illustrated in FIG. 4b is similar to that shown in FIG. 4a, but is provided with a border and magnification. Recall that the user can specify the degree of magnification, in accordance with some embodiments. Further recall that the user may also resize the reading guide, for example, so that additional lines of text can be viewed (e.g., by simultaneously pulling top and bottom edges of the reading pane in opposite directions, or any other such suitable resizing gesture). Further recall that content highlighting within or otherwise at the reading guide can be used if so desired (e.g., reading with fingertip scenario). With respect to the specific example of FIG. 4c, a virtual ruler or straight-edge reading guide is provided that highlights a single line of text/content to the user. In this example case, the background text is not faded out, but could be if so desired. The user manually controls the placement of the ruler based on dragging of the contact point.

Figure 4D:
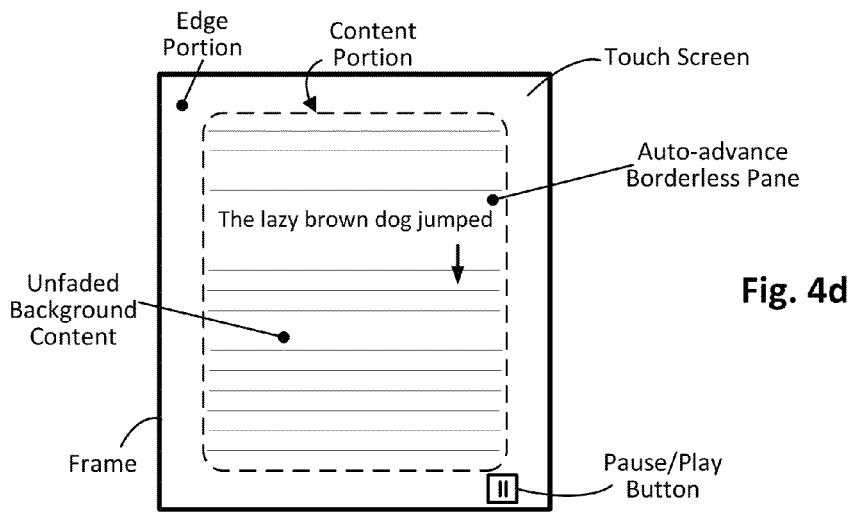
Figure 4E:
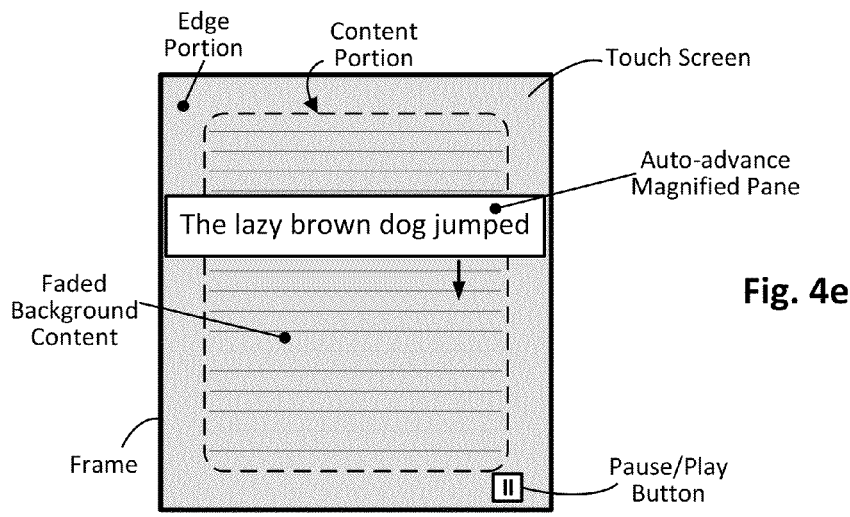
Figure 4F:
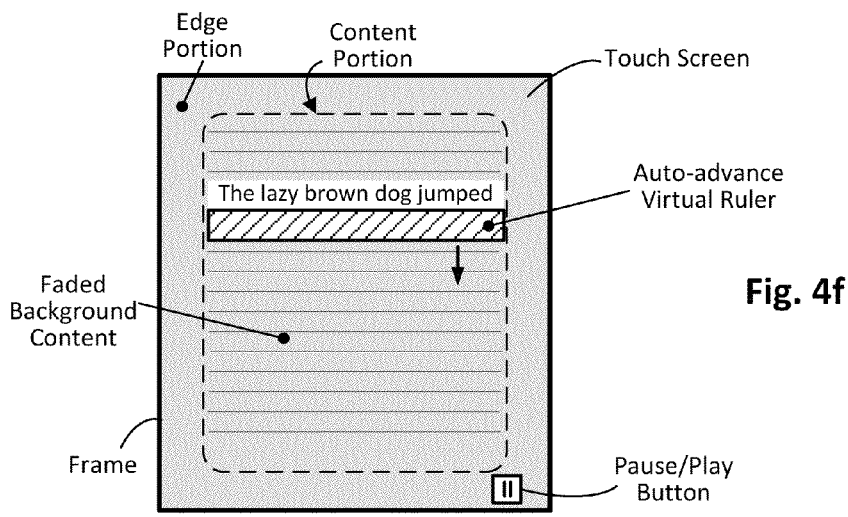

With respect to the specific example of FIG. 4d, a borderless reading pane is provided that highlights a single line of text/content to the user, and the background text is not faded out. In this example case, the auto-advance function is selected, so the reading pane automatically advances at a rate suitable to the user's consumption speed. As previously explained, the user may pause the auto-advancement of the UI feature by tapping the pause button provided in the lower right corner of the touch screen, in this example case. Upon pausing, the pause UI feature changes to a play UI feature that the user can tap to re-start the auto-advancement. Also recall that the user can at any time manually control the placement of the reading pane by contacting the touch screen over the pane (or proximate to the pane) and dragging to a point of interest in the displayed content. In some such example cases, the initial touch by the user causes the auto-advance to pause (and the UI play feature then appears), and when the user is done dragging the reading pane, the UI play feature can then be tapped to resume auto-advancement (e.g., from the point where the reading pane was left by the user, or from the point where auto-advancement was paused). The user can exit auto-advancement, for example, by pressing the home button or some other hardware or software feature provisioned for allowing exit from the auto-advancement routine. The example auto-advancing reading pane illustrated in FIG. 4e is similar to that shown in FIG. 4d, but is provided with a border and magnification, and faded background content. FIG. 4f shows an example of an auto-advancing reading pane and ruler combination, with faded background content. Numerous configurations will be apparent.

Figure 5:
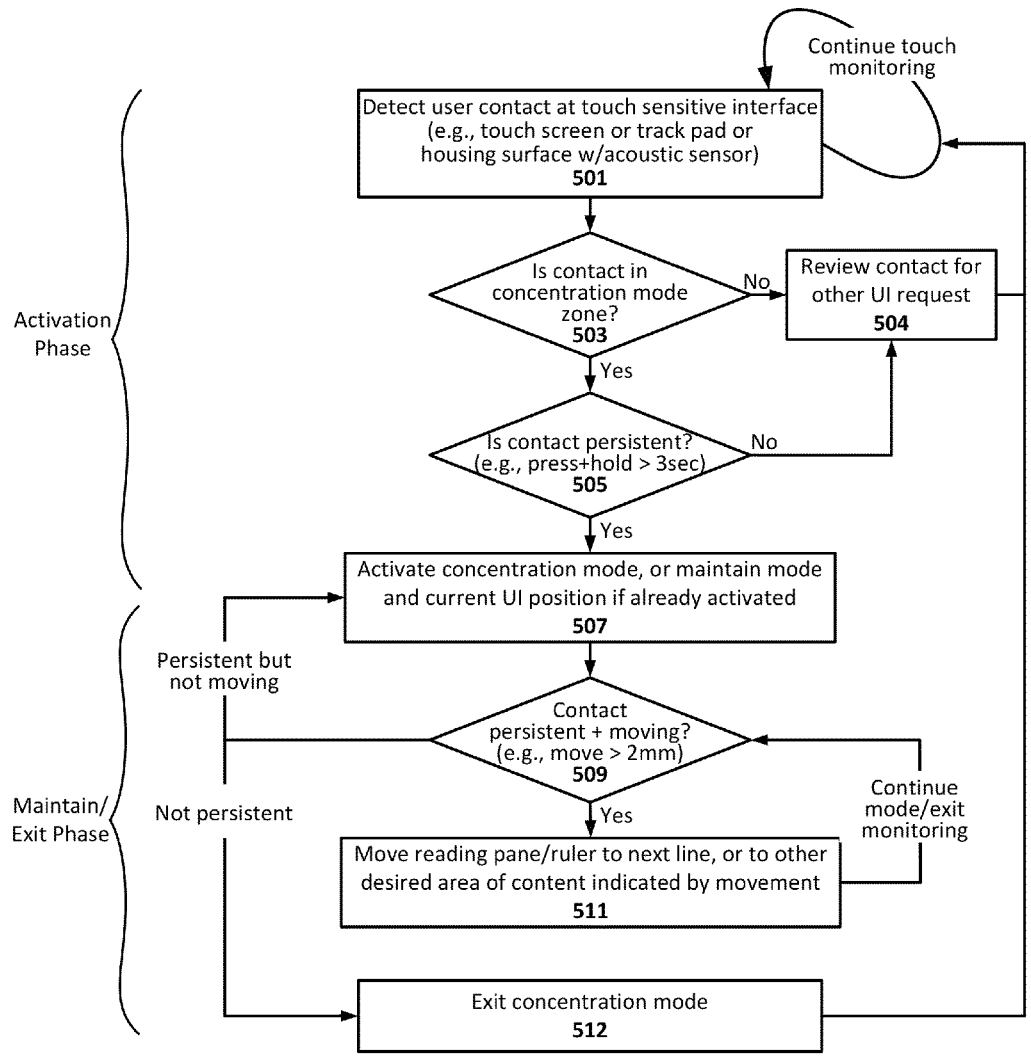
FIG. 5 illustrates a method for providing a concentration mode in an electronic touch sensitive device, in accordance with an embodiment of the present invention.

FIG. 5 illustrates a method for providing a concentration mode in an electronic touch screen device, in accordance with an embodiment of the present invention. This example methodology may be implemented, for instance, by the UI module of the touch sensitive device shown in FIG. 2a, or the touch sensitive device shown in FIG. 2b (e.g., with the UI provisioned to the client by the server). To this end, the UI can be implemented in software, hardware, firmware, or any combination thereof, as will be appreciated in light of this disclosure.

As can be seen, the method includes an activation phase and a maintain/exit phase. Each phase includes sensing a user's input by a touch sensitive surface. In general, any touch sensitive device may be used to detect contact with it by one or more fingers and/or styluses. As soon as the user begins to drag or otherwise move the contact points, the UI code (and/or hardware) can assume a drag gesture has been engaged and track the path of each contact point with respect to any fixed point within the touch surface until the user stops engaging the touch sensitive surface. The release point can also be captured by the UI as it may be used to commit the action started when the user pressed on the touch sensitive surface. In a similar fashion, if the user releases hold without moving the contact point, a press or press-and-hold command may be assumed depending on the amount of time the user was continually pressing on the touch sensitive surface. These main detections can be used in various ways to implement UI functionality.

In this example case, the method includes detecting 501 user contact at the touch sensitive interface. In general, the touch monitoring is effectively continuous. The method continues with determining 503 if the contact is in the concentration mode activation zone. As previously indicated, one example activation zone is the edge of the touch sensitive surface. Other embodiments may have the activation zone anywhere on the touch sensitive surface that is specified by the user via a configuration menu. In a more general sense, the concentration mode activation zone can be pre-established in any specific location on the touch sensitive surface of the device.

In any case, if the contact is not in the concentration mode activation zone, then the method may continue with reviewing 504 the contact for some other UI request (e.g., select a file, send an email, etc). On the other hand, if the contact is in the concentration mode activation zone, the method continues with determining 505 if the contact is persistent. For instance, if the contact is a press-and-hold that lasts greater than 3 seconds (or some other designated time period), then the UI code can assume the contact is persistent. In any case, if the contact is not sufficiently persistent, then the method may continue with reviewing 504 the contact for some other UI request (e.g., select a file, send an email, etc). On the other hand, if the contact is deemed to be sufficiently persistent, then the method continues with activating 507 the concentration mode, or maintaining that mode along with the current reading guide feature position on the display if already activated.

In the maintain/exit phase, the method continues with determining 509 if the contact on the touch sensitive surface is persistent and moving. If the contact is persistent but not moving (e.g., movement ≤2 mm), then the UI code assumes the user is actively consuming content of the current line and the method continues with maintaining 507 the concentration mode along with the current reading guide feature position on the display. If the contact is not persistent, then the method continues with exiting 512 the concentration mode. However, if the contact is both persistent and moving (e.g., movement >2 mm), then the method continues with moving 511 the reading pane/ruler UI feature to next line or to the otherwise desired area of the content indicated by the contact movement on the touch sensitive surface. As can be further seen, the method includes continuously monitoring the contact point for persistence and movement.

Figure 6:
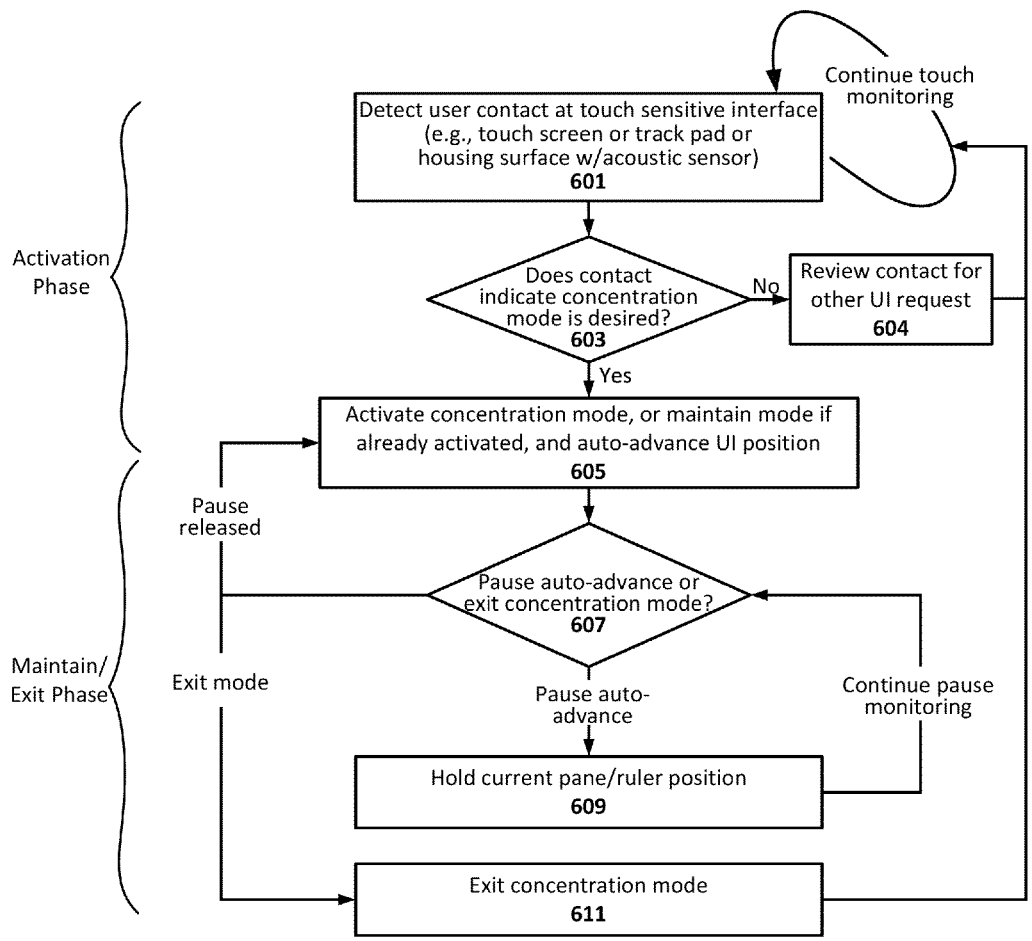
FIG. 6 illustrates a method for providing a concentration mode in an electronic touch sensitive device, in accordance with another embodiment of the present invention.

FIG. 6 illustrates a method for providing a concentration mode in an electronic touch screen device, in accordance with another embodiment of the present invention. Just as with the method of FIG. 5, this methodology includes an activation phase and a maintain/exit phase, and the previous relevant discussion is equally applicable here. However, the methodology employs an auto-advance feature. The activation phase includes detecting 601 user contact at the touch sensitive interface, and determining 603 if that contact indicates that the concentration mode is desired (e.g., based on the unique set of multiple contact points provided by the user). If not, then the method may continue with reviewing 604 the contact for some other UI request (e.g., select a file, send an email, etc). On the other hand, if the contact indicates that the concentration mode is desired, the method continues with activating 605 the concentration mode, or maintaining that mode if already activated and auto-advance the reading pane/ruler UI feature position.

The method continues in the maintain/exit phase with determining 607 if the user has selected pause or wishes to exit the concentration mode (this monitoring is continuous in this example embodiment). If the user has selected pause, then the method continues with holding 609 the current reading pane/ruler UI feature position, and the continuous monitoring continues. If the user releases the pause by selecting a play UI feature, then the method continues with maintaining 605 the concentration mode and auto-advancement of the reading pane/ruler UI feature position, and the continuous monitoring continues. If the user signal an exit is desired (e.g., by selecting an exit UI feature or pressing the home button), then the method continues with exiting 611 the concentration mode, and the continuous touch monitoring continues.

Numerous variations will be apparent in light of this disclosure. For instance, one example embodiment provides a device that includes a display for displaying content to a user, and a touch sensitive surface for allowing user input. The device further includes a user interface including a reading guide feature for highlighting a line of the content displayed to a user, the reading guide feature configured to be displayed on the display in response to user contact via the touch sensitive interface, the user contact uniquely identifying the user's desire to use the reading guide feature and including multiple contact points. In some cases, the display is a touch screen display that includes the touch sensitive surface. In some cases, the touch sensitive surface is a track pad. In some cases, the reading guide feature includes at least one of a reading pane and/or a straight-edge. In some cases, content displayed to the user that is not highlighted by the reading guide feature is faded (e.g., grayed out, blacked-out, blurred, etc). In some cases, the reading guide feature provides magnification and/or is user-resizable (so as to view more lines of text). In some such cases, the degree of magnification is user-configurable. In some cases, the reading guide feature advances in response to user dragging contact on the touch sensitive surface. In some cases, the reading guide feature advances automatically. In some cases, the reading guide feature advances automatically at a rate that is user-configurable.

Another example embodiment provides a device that includes a display having a touch screen interface and for displaying content to a user, and a user interface including a reading guide feature for highlighting a complete line of the content displayed to a user, the reading guide feature configured to be displayed on the display in response to user contact via the touch screen interface, the user contact uniquely identifying the user's desire to use the reading guide feature and including multiple contact points, wherein the reading guide feature includes at least one of a reading pane and/or a straight-edge. In some cases, content displayed to the user that is not highlighted by the reading guide feature is faded, and/or content that is highlighted by the reading guide can be selectively amplified (e.g., amplified by virtue of formatting such as bolding, underlining, color change, or by virtue of magnification) by the user. In some cases, the reading guide feature provides magnification and/or is user-resizable. In some cases, the reading guide feature advances automatically at a rate that is user-configurable. In some cases, the device is an eReader device or a tablet computer or a smartphone.

Another example embodiment provides a computer readable medium encoded with instructions that when executed by one or more processors, cause a process to be carried out. The process includes, in response to user contact via a touch sensitive interface, providing for display to the user a user interface including a reading guide feature for highlighting a line of content displayed to a user, the user contact uniquely identifying the user's desire to use the reading guide feature and including multiple contact points, and advancing the reading guide feature as the user consumes the content. In some cases, the reading guide feature includes at least one of a reading pane and/or a straight-edge. In some cases, the process further includes causing content displayed to the user that is not highlighted by the reading guide feature to be faded. In some cases, the reading guide feature advances in response to user dragging contact on the touch sensitive surface. In other example cases, the reading guide feature advances automatically.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
a display for displaying content to a user;
a touch sensitive surface for allowing user input; and
a user interface including a reading guide feature for temporarily highlighting a line of the content displayed to a user, the reading guide feature configured to be displayed on the display in response to user contact via the touch sensitive interface, the user contact uniquely identifying the user's desire to use the reading guide feature and including multiple contact points applied simultaneously, wherein the reading guide feature is maintained until all user contact has been removed.

2. The device of claim 1 wherein the display is a touch screen display that includes the touch sensitive surface.

3. The device of claim 1 wherein the touch sensitive surface is a track pad.

4. The device of claim 1 wherein the reading guide feature includes at least one of a reading pane and/or a straight-edge.

5. The device of claim 1 wherein content displayed to the user that is not highlighted by the reading guide feature is faded.

6. The device of claim 1 wherein the reading guide feature provides magnification and/or is user-resizable.

7. The device of claim 6 wherein the degree of magnification is user-configurable.

8. The device of claim 1 wherein the reading guide feature advances in response to user dragging contact on the touch sensitive surface.

9. The device of claim 1 wherein the reading guide feature advances automatically.

10. The device of claim 1 wherein the reading guide feature advances automatically at a rate that is user-configurable.

11. A device, comprising:
a display having a touch screen interface and for displaying content to a user; and
a user interface including a reading guide feature for highlighting a complete line of the content displayed to a user, the reading guide feature configured to be displayed on the display in response to user contact via the touch screen interface, the user contact uniquely identifying the user's desire to use the reading guide feature and including multiple contact points applied simultaneously, wherein the reading guide feature advances automatically at a predetermined rate until paused or stopped.

12. The device of claim 11 wherein content displayed to the user that is not highlighted by the reading guide feature is faded, and/or content that is highlighted by the reading guide can be selectively amplified by the user.

13. The device of claim 11 wherein the reading guide feature provides magnification and/or is user-resizable.

14. The device of claim 11 wherein the reading guide feature advances automatically at a rate that is user-configurable.

15. The device of claim 11 wherein the device is an eReader device or a tablet computer or a smartphone.

16. A non-transitory computer readable medium encoded with instructions that when executed by one or more processors, cause a process to be carried out, the process comprising:
in response to user contact via a touch sensitive interface, providing for display to the user a user interface including a reading guide feature for temporarily highlighting a line of content displayed to a user, the user contact uniquely identifying the user's desire to use the reading guide feature and including multiple contact points applied simultaneously;
advancing the reading guide feature as the user consumes the content; and
maintaining the reading guide feature until all user contact has been removed.

17. The computer readable medium of claim 16 wherein the reading guide feature includes at least one of a reading pane and/or a straight-edge.

18. The computer readable medium of claim 16 wherein the process further includes causing content displayed to the user that is not highlighted by the reading guide feature to be faded.

19. The computer readable medium of claim 16 wherein the reading guide feature advances in response to user dragging contact on the touch sensitive surface.

20. The computer readable medium of claim 16 wherein the reading guide feature advances automatically.

* * * * *